(12) United States Patent
Feuilloley et al.

(10) Patent No.: US 8,921,808 B2
(45) Date of Patent: Dec. 30, 2014

(54) UNIT FOR TREATING BLANKS OF HOLLOW BODIES WITH RADIATION, PROVIDED WITH A RADIATION-CONTAINMENT AIRLOCK

(75) Inventors: Guy Feuilloley, Octeville sur Mer (FR); Philippe Freire-Diaz, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 77 days.

(21) Appl. No.: 13/581,672

(22) PCT Filed: Mar. 10, 2011

(86) PCT No.: PCT/FR2011/050490
§ 371 (c)(1),
(2), (4) Date: Nov. 7, 2012

(87) PCT Pub. No.: WO2011/110791
PCT Pub. Date: Sep. 15, 2011

(65) Prior Publication Data
US 2013/0056649 A1 Mar. 7, 2013

(30) Foreign Application Priority Data
Mar. 10, 2010 (FR) ...................................... 10 00959

(51) Int. Cl.
*B29C 49/68* (2006.01)
*B29C 49/64* (2006.01)
*B29K 67/00* (2006.01)

(52) U.S. Cl.
CPC ............. *B29C 49/68* (2013.01); *B29C 49/6418* (2013.01); *B29K 2067/00* (2013.01)
USPC ................................ 250/455.11; 250/453.11

(58) Field of Classification Search
USPC ............................. 250/453.11–455.11, 492.1
See application file for complete search history.

(56) References Cited

U.S. PATENT DOCUMENTS

| | | | | |
|---|---|---|---|---|
| 3,886,353 | A * | 5/1975 | Shioya | 250/223 B |
| 4,008,401 | A * | 2/1977 | Holoubek et al. | 250/453.11 |
| 4,111,738 | A * | 9/1978 | Amberg | 156/458 |
| 6,632,087 | B1 * | 10/2003 | Armellin et al. | 432/202 |
| 2004/0047941 | A1 | 3/2004 | Salenbien et al. | |
| 2009/0317506 | A1* | 12/2009 | Adriansens | 425/103 |
| 2013/0015365 | A1* | 1/2013 | Bufano et al. | 250/454.11 |

FOREIGN PATENT DOCUMENTS

| | | |
|---|---|---|
| DE | 10 2007 031 771 A1 | 1/2009 |
| WO | 01/49075 A1 | 7/2001 |

* cited by examiner

*Primary Examiner* — Jack Berman
*Assistant Examiner* — David E Smith
(74) *Attorney, Agent, or Firm* — Sughrue Mion, PLLC (57) ABSTRACT

A unit for treating blanks of hollow bodies made of a plastic material which includes: an enclosure which the blanks travel through longitudinally; a plurality of electromagnetic radiation sources, arranged on at least one lateral side of the enclosure; at least one airlock adjoining the enclosure, provided with mobile shields that are opaque to the electromagnetic radiation travelling along a path locally encroaching upon the path of the blanks; two shields defining two-by-two an area for holding at least one blank.

10 Claims, 6 Drawing Sheets

UNIT FOR TREATING BLANKS OF HOLLOW BODIES WITH RADIATION, PROVIDED WITH A RADIATION-CONTAINMENT AIRLOCK

CROSS REFERENCE TO RELATED APPLICATIONS

This application is a National Stage of International Application No. PCT/FR2011/050490 filed on Mar. 10, 2011, claiming priority based on French Patent Application No. FR10/00959 filed Mar. 10, 2010, the contents of all of which are incorporated herein by reference in their entirety.

The invention relates to the manufacture of hollow bodies such as containers, by blowing or stretch-blowing from blanks made of plastic material.

The term "blank" designates a preform, obtained by injection of a plastic material into a mold, or an intermediate hollow body obtained from a preform having undergone at least a first forming operation and intended to undergo at least a second one.

More specifically, the invention relates to the processing, for example thermal (heat) or decontamination, of the blanks. The processing of the blanks is generally performed by passing them through a processing unit (commonly called "oven" in the case of heating), equipped with a plurality of sources of electromagnetic radiation in front of which the blanks pass, driven in rotation around the axes thereof.

Although the conventional technique of heating blanks by means of tubular incandescent halogen lamps radiating according to Planck's law over a continuous spectrum is the most widely used to date, an alternative technology has recently emerged, based on the use of monochromatic or pseudo-monochromatic electromagnetic radiation (particularly lasers), emitting in the infrared range (see French patent application nos. FR 2 878 185 and FR 2 915 418 in the name of the applicant).

The performance and properties (particularly optical precision) of laser heating, which are superior to those of halogen heating, make it possible to achieve a heating of the blanks that is faster and more selective.

However, laser heating requires the implementation of equipment suitable for the hazards of this type of infrared radiation, which is invisible to man and can cause serious injuries not only to the eyes, but also to the skin.

It is therefore necessary to confine as much as possible the enclosure through which the blanks pass, in order to provide maximum limitation of radiation leaks. However, this confinement is complicated by the need to provide ventilation of the enclosure—and therefore orifices allowing circulation of air—and openings at the entry and exit of the enclosure to allow the blanks to pass through.

The inventors considered having the preforms follow winding paths upstream and downstream of the enclosure in order to trap the radiation, but the result would be an inevitable mechanical complexity, along with premature wear of the supports to which the blanks are hooked, which would be unacceptable from the production point of view.

The invention seeks to overcome the abovementioned difficulties by proposing a solution for confining the enclosure that, at the very least, does not alter the path followed by the blanks.

To that end, the invention proposes a unit for processing hollow body blanks made of plastic material that comprises:
an enclosure in which the blanks pass longitudinally,
a plurality of electromagnetic radiation sources, arranged on at least one side of the enclosure,
at least one chamber adjoining the enclosure, equipped with movable shields that are opaque to electromagnetic radiation, defining two by two an intake zone of at least one blank, and circulating on a trajectory impinging locally on the path of the blanks.

Due to the structure of the chamber, it is not necessary to modify the path of the blanks, which in particular can be rectilinear. In this way, the speed of travel is not altered by the presence of the chamber, while said chamber ensures good confinement of the electromagnetic radiation inside the enclosure. The risks of leakage of the radiation are thus minimized, to the benefit of the safety of the heating unit.

The shields are, for example, movable in rotation. According to one embodiment, the chamber comprises at least one pair of turnstiles mounted in free rotation on either side of the path of the blanks, the turnstiles being capable of being driven in rotation by supports of blanks circulating between them, and comprising a circular series of radial panels arranged in star form, which form said shields.

More specifically, each turnstile comprises for example a pair of star-shaped plates mounted in free rotation and between which the panels are mounted, which can radiate in star form from a central sleeve that provides the bracing of the plates.

According to a particular embodiment, each turnstile comprises a lower plate that impinges locally upon the path of the blanks, said plate being provided at its periphery with a circular series of indentations capable of being engaged by blank supports.

The turnstiles are preferably offset from each other along the path of the blanks, and tangent to their periphery.

The chamber can further comprise partitions arranged laterally on either side of the path of the blanks, which define two openings in the chamber through which the blanks pass.

Spacers can be arranged on either side of an opening of the chamber toward the enclosure, thus ensuring a connection, hermetic to the radiation, of the enclosure and the chamber.

Other objects and advantages of the invention will be seen from the following description provided with reference to the appended drawings in which.

Represented in the figures is a unit 1 for processing hollow body blanks 2 made of plastic material. In this instance, the blanks 2 are preforms intended to form containers, but it could involve intermediate containers having undergone one or more preforming operations (for example provisional blowing).

Each preform 2 has a substantially cylindrical body 3, closed at one end by a hemispherical bottom 4 and being extended to an opposite end by a neck 5.

Figure 1:
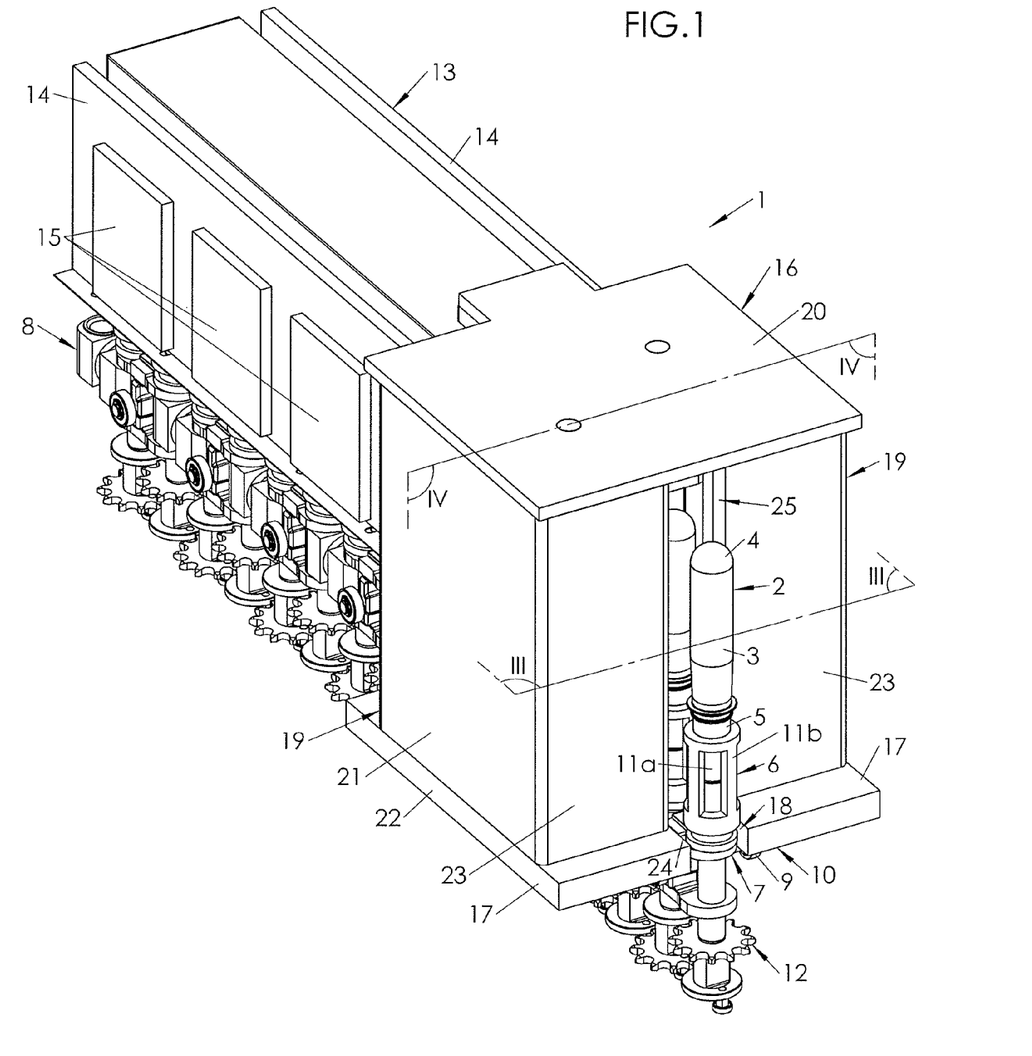
FIG. 1 is a view in perspective showing a blank heating unit provided with a chamber.
Figure 2:
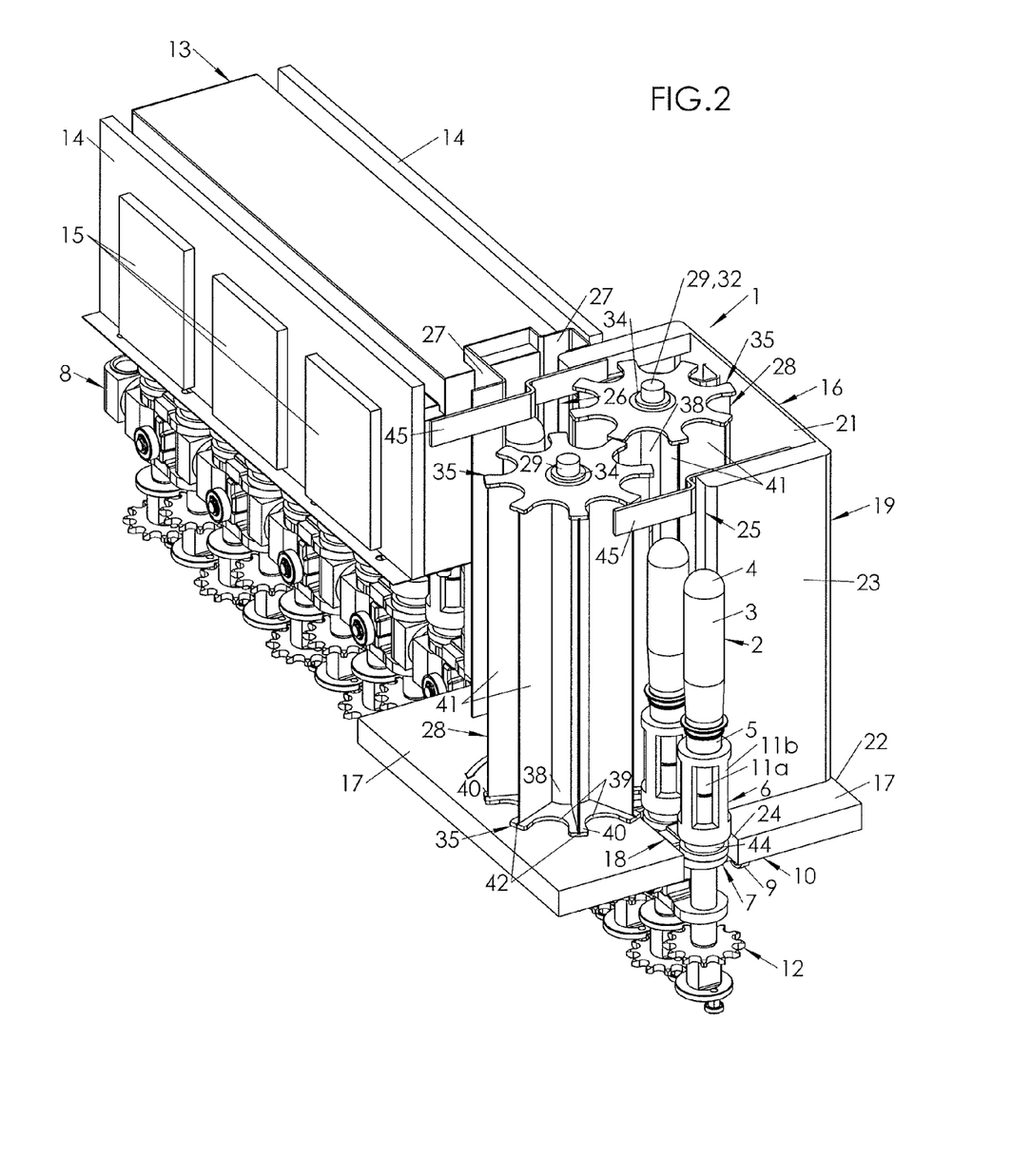
FIG. 2 is a view in perspective, partially cut away, of the heating unit of FIG. 1.
Figure 3:
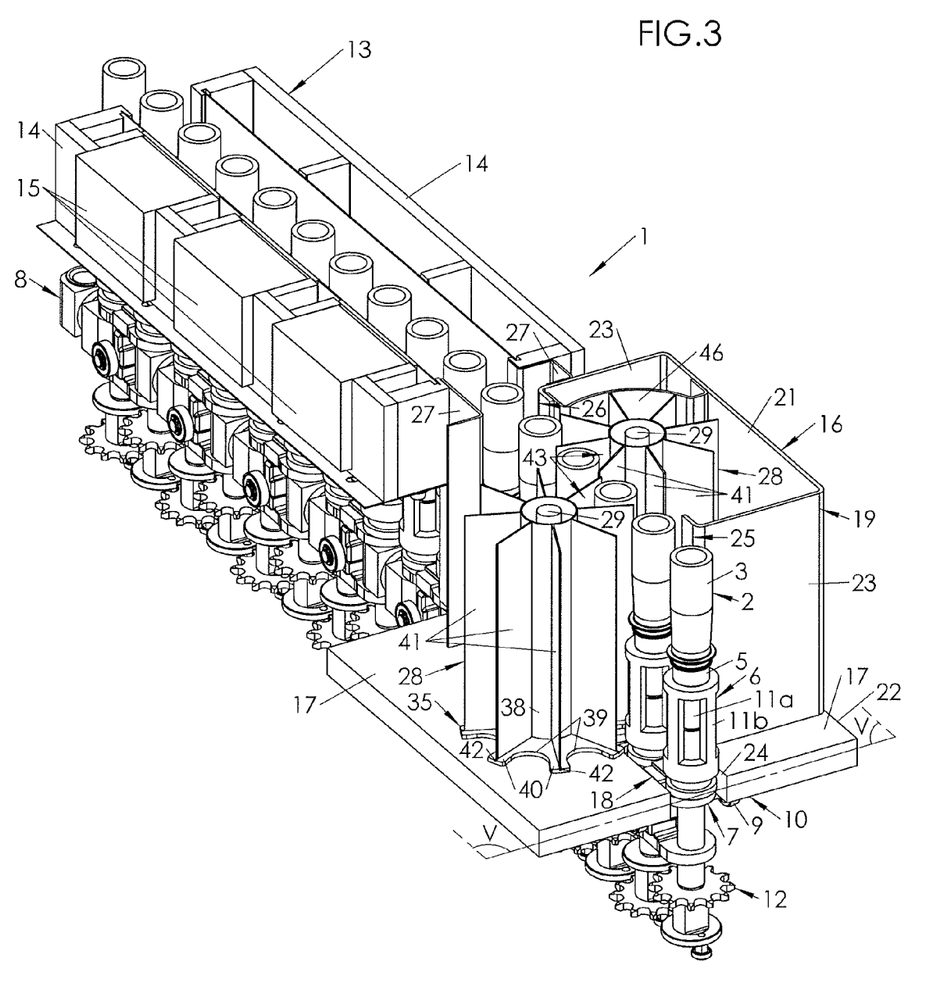
FIG. 3 is a view in perspective of the heating unit of FIG. 1, partially cut away, cut along the horizontal plane III-III.

In the figures, the preforms 2 are represented from the neck 5 downwards: it is in this position that they are inserted into the processing unit 1 and through which they pass, along a substantially rectilinear longitudinal path (although it can have any type of profile) extending between an entrance and exit of the processing unit 1. In FIGS. 1, 2 and 3, it is assumed that the preforms 2 pass from right to left, so that the entry is situated at the right. However, the operation could be reversed, in which case the entrance and exit would be reversed.

Each preform 2 is mounted by its neck 5 on a rotary gripping device 6 called a spinner and is attached to a link 7 of a chain 8 driven in motion at a constant linear speed, the seat of which is maintained by means of rollers 9 rolling on tracks 10 along the route (in order to leave the lower parts of the spinners 6 visible, the tracks 10 are only partially represented in FIGS. 1, 2 and 3).

Figure 4:
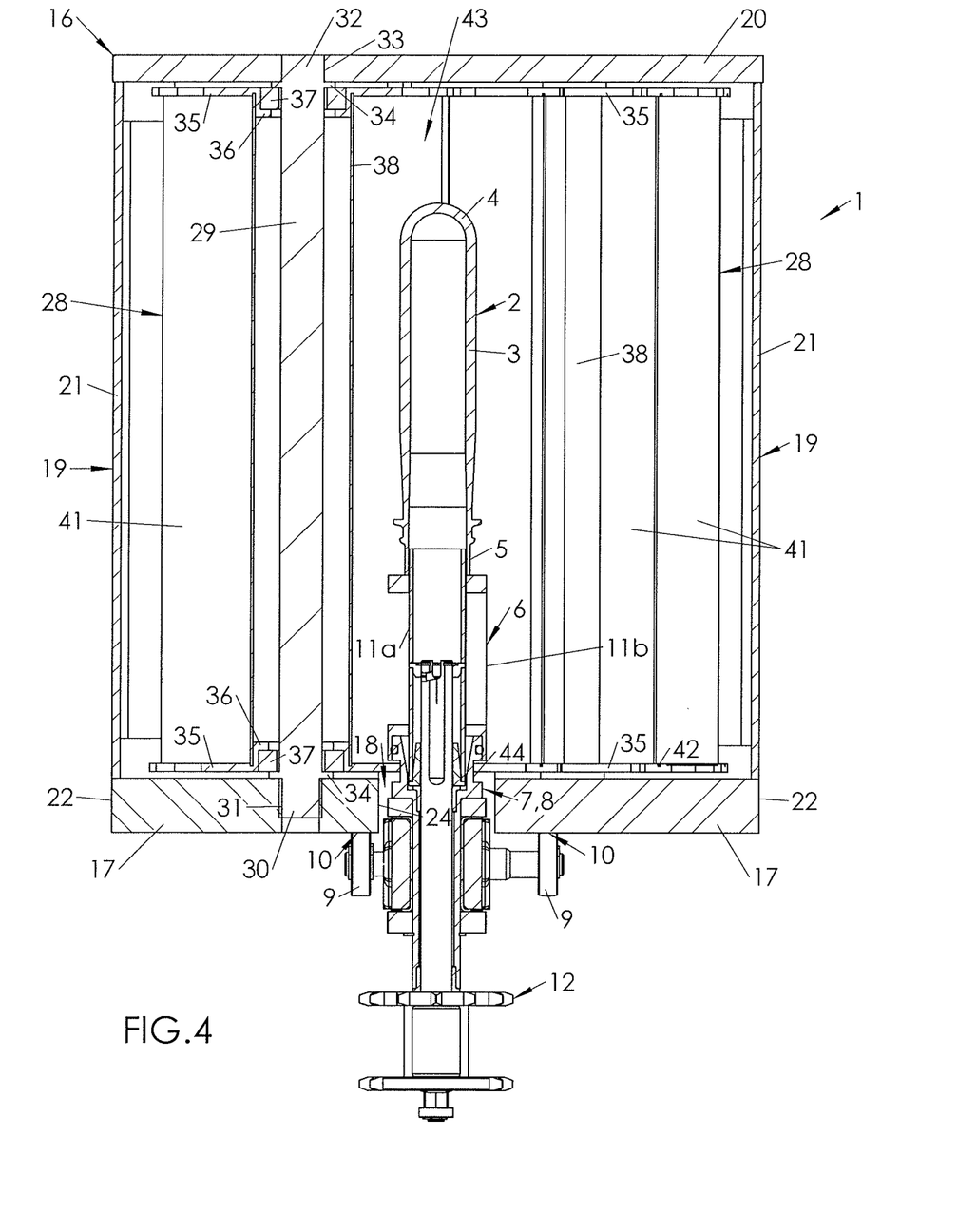
FIG. 4 is a view in transverse cross-section of the heating unit of FIG. 1, cut along the vertical plane IV-IV.

As can be clearly seen in the drawings, and more particularly in cross-section in FIG. 4, each spinner 6 comprises a nozzle 11a inserted in the neck 5 for the removable attachment of the preform 2, a movable sleeve 11b with an opening for the ejection of the preform 2, and a pinion 12 rotationally fixed to the nozzle 11a, which meshes with a fixed flat gear (not shown for purposes of clarity) arranged along the route of the preforms 2. In this way, each preform 2 is driven in rotation around its axis at a speed of rotation directly proportional to its linear speed of travel. By way of illustration, the processing unit 1 as represented here is configured to process the preforms 2 with the neck 5 downwards. As a variation, the unit 1 can be configured to process preforms 2 with the neck 5 upwards, although this configuration does not affect the following description.

The processing unit 1 comprises a radiation enclosure 13 (to the left in FIGS. 1, 2 and 3), bordered by two parallel side walls 14 facing each other, which extends vertically along the route, on either side thereof.

At least one of the walls 14, called emitter wall, is lined with a plurality of sources 15 of electromagnetic radiation preferably emitting monochromatically or pseudo-monochromatically, directed towards the interior of the enclosure 13. If the processing of the preforms 2 is a thermal processing (heating), the sources 15 are chosen to emit in the infrared range. If the processing is for decontamination, the sources 15 (generally pulsed light xenon vapor lamps) are chosen because their spectrum covers ultraviolet light, which is a germicide.

In theory, a monochromatic source is an ideal source, emitting a sinusoidal wave of a single frequency. In other words, its frequency spectrum is composed of a single ray of zero spectral width (Dirac).

In practice, such a source does not exist, a real source being at best quasi-monochromatic, i.e., its frequency spectrum extends over a band of spectral width that is small but not zero, centered on a main frequency where the intensity of the radiation is maximum. However, it is customary to imprecisely refer to such a real source as monochromatic. Moreover, a source emitting quasi-monochromatically over a discrete spectrum comprising several narrow bands centered on distinct main frequencies is called "pseudo-monochromatic." This is also referred to as a multimode source.

The advantage of such radiation is that it is concentrated on one or more frequencies for which the thermal behavior of the material of the preforms 2 is of particular interest with regard to the specifications. By way of example, in order to obtain rapid surface heating of the preforms 2, a frequency (or several frequencies) can be chosen in the infrared range for which the material is very absorbent. On the contrary, to obtain heating that is slower but more homogeneous in the thickness of the preforms 2, a frequency (or several frequencies) can be chosen for which the material is relatively less absorbent.

In the following, it is assumed that the processing is heating, the processing unit 1 thus being a heating unit (also called "oven"). In this application, each preform 2, produced from a thermoplastic material such as polyethylene terephthalate (PET), after having been softened by heating in the oven 1 at a temperature above its glass transition temperature, is intended to undergo a blowing or stretch-blowing operation in a mold in order to form a container such as a bottle or flask.

In practice, the sources 15 are infrared laser diodes organized by juxtaposition and superposition in order to form one or more matrices, for example like the one described in international application WO 2006/0566673 in the name of the applicant. In this instance, each matrix can be a matrix of vertical-cavity surface-emitting laser diodes (VCSEL), for example each diode emitting a one-watt laser beam with a wavelength of about 1 μm. In the example illustrated in FIGS. 1, 2 and 3, the oven 1 is equipped with a plurality of matrices of diodes disposed side-by-side along the enclosure 13.

It is desirable to confine the electromagnetic radiation emitted by the sources 15. Indeed, radiation emitted in the ultraviolet or infrared range is not perceptible by the human eye, and prolonged exposure (even unaware) to this radiation should be avoided because of the potential risk of lesion of the retina, depending on the power of the radiation emitted. Laser radiation in particular, coherent and very directive, is very little dispersed at the scale of a meter (which is the scale considered within the scope of this description).

Of course it would be technically feasible, in order to totally confine the radiation, to proceed with a sequential heating of the preforms, consisting of taking a series of preforms 2 into the enclosure 13, hermetically closing the enclosure 13, then exposing the preforms 2 to the radiation, then removing the preforms 2 while taking in the next series, the radiation being temporarily interrupted during the exit and entry of preforms 2 in order to avoid any dispersion outside the enclosure 13.

This solution would be satisfactory from the point of view of safety, but on the one hand, it would not be very compatible with production at a higher rate because it would require the periodic interruption of the progress of the preforms, and on the other hand, it would be susceptible, due to the jerks on the chain 8, to causing premature wear thereof.

Also, it is preferable to preserve a continuous movement of the preforms 2 in the processing unit 1. Two limitations must therefore be taken into account. First, the electromagnetic radiation is constant, i.e., it is not interrupted during production. Secondly, the enclosure 13 cannot be hermetically closed because it must allow the continuous entry and exit of the preforms 2.

That is why the processing unit 1 comprises, at the entry and/or exit, a chamber 16 that adjoins the enclosure 13 at one at least of its longitudinal ends, the function of which is to trap the radiation issuing from the enclosure 13 while permitting the continuous entry and/or exit of the preforms 2 into/from the enclosure 13.

In the example illustrated in the drawings, a single chamber 16 is illustrated for purposes of simplicity. On the assumption that, as mentioned above, the preforms 2 circulate from right to left, it can be seen that the chamber 16 is here placed at the entry of the processing unit 1. In a reverse assumption, where the preforms 2 circulate from left to right, it will be understood that the example illustrated shows a chamber 16 placed at the exit of the processing unit 1. The processing unit 1 can also be provided with two chambers 16, one placed at the entry and the other at the exit.

The chamber 16 comprises:
- a base consisting of two base plates 17 separated from each other to form a gap 18 suitable for allowing the passage of the chain 8 (and thus the passage of the preforms 2), a lower face of which forms a track 10 on which the rollers 9 roll,
- two partitions 19 of U-shaped cross-section, each attached to a base plate 17 on either side of the gap 18, and
- a cover 20 of a single piece that overlaps the partitions 19 while closing off the top of the passage of the chain 8 and preforms 2.

Each partition 19 comprises a lateral section 21 that extends longitudinally parallel to the path of the preforms 2 along an outer edge 22 of the base plate 17, and two right-angle returns 23 that extend transversely from the lateral section 21 to an inner edge 24 of the base plate 17, delimiting the gap 18.

The right-angle returns 23 arranged facing each other together delimit the openings of the chamber 16 through which the preforms 2 pass, i.e., an outer opening 25 facing outwards from the processing unit 1, and an inner opening 26 facing the enclosure 13.

Figure 6:
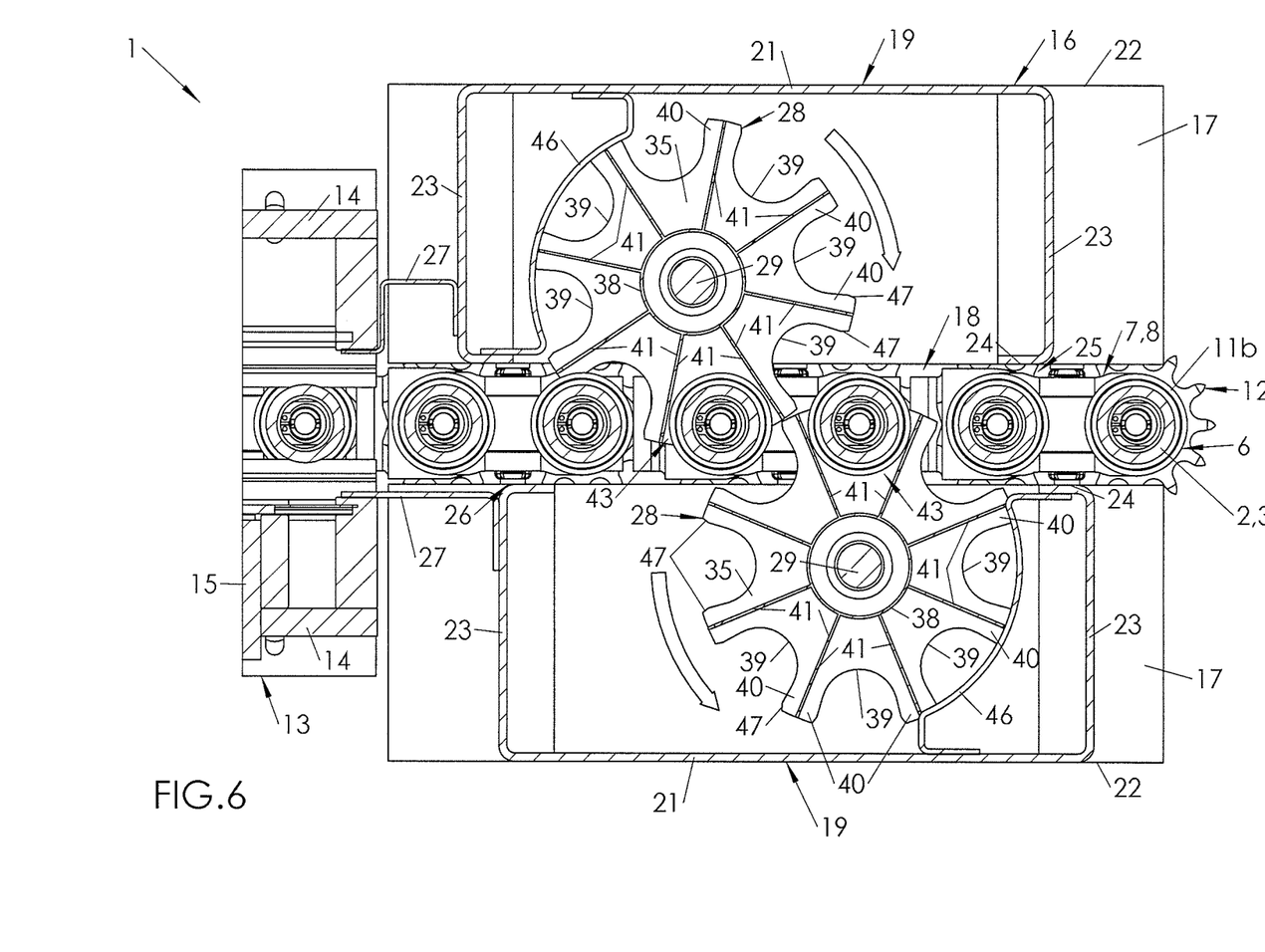
FIG. 6 is a detailed plan view of the heating unit of FIG. 1, cut along the horizontal plane III-III.

As can be clearly seen in FIGS. 3 and 6, the chamber 16 is not necessarily in direct communication with the enclosure 13, because the inner opening 26 can be slightly separated therefrom. Such separation can be provided by design, in order to decrease the solid angle of the radiation issuing from the enclosure 13 and penetrating into the chamber 16. In this case, it is advantageous to seal off the interval between the chamber 16 and the enclosure 13, on either side of the inner opening 26, by means of spacers 27 (here in the form of metal channels) ensuring a connection hermetically sealed from radiation of the enclosure 13 and the chamber 16.

Of course, the base plates 17, the partitions 19 and the top 20 are produced from materials that can withstand high temperatures and are opaque to electromagnetic radiation issuing from the enclosure 13. Sheet steel can be used, preferably having a radiation-absorbent coating (for example matte black paint) on its inner face (towards the interior of the chamber).

As illustrated in the drawings, and more visibly in FIG. 2, the chamber 16 is provided with a pair of turnstiles 28 mounted vertically between a respective base plate 17 and the top 20.

Each turnstile 28 comprises a fixed shaft 29, a threaded lower end 30 of which is screwed into a threaded hole 31 made in the corresponding base plate 17, and an upper end 32 housed in an upper hole 33 made in the top 20, vertically above the hole 31.

At each of its ends 30, 31, the shaft 29 is provided with flanges 34 that form end stops pressed respectively against the base plate 17 and the top 20.

The turnstile 28 further comprises two star-shaped plates 35, i.e., a lower plate, mounted on the shaft 29 near the lower end 30, and an upper plate, mounted on the shaft 29 near the upper end 32.

Each plate 35 comprises a hub 36 by which it is mounted in such a way as to rotate freely on the shaft 29, for example by means of a roller bearing 37 or a bearing inserted axially between the flange 34 and the hub 36.

The plates 35 are braced by means of a cylindrical sleeve 38 surrounding the shaft 29, the ends of which sleeve are fitted onto the hubs 36.

Each plate 35 has a circular contour and includes at its periphery a series of regular circular indentations 39 with circular profile, in this instance eight in number (although this number can be more or less), defining between them a circular series of arms 40 of radial extension, so that the plate 35 has, in plan view, the profile of a gear.

Each turnstile 28 is further provided with a circular series of panels 41 (equal in number to the arms, therefore eight in this instance) that extends vertically between the plates 35, with respect to which they are immobilized, and radially in the axis of the arms 40 from the sleeve 38 to the periphery of the plate 35.

The panels 41 are immobilized in rotation with respect to the plates 35 by being inserted, at their ends, into the grooves 42 made radially in the plates 35 in the axis of the arms 40. The radial immobilization of the panels 41 can be achieved by gluing their ends into the grooves 42. However, according to a preferred embodiment illustrated in the drawings, the panels 41 form a one-piece assembly with the sleeve 38.

The shaft 29 can be made of steel. The plates 35 can be made of steel, aluminum (or alloy) or preferably of a wear-resistant plastic material of low coefficient of friction, such as PA (polyamide), POM (polyacetyl), PTFE (polytetrafluoroethylene), or equivalent.

The panels 41 (like the sleeve 38) are made of a material opaque to the electromagnetic radiation issuing from the enclosure 13. In order to make the turnstile 28 somewhat lightweight, the panels 41 are preferably made of a plastic material selected for its high-working temperature and its barrier properties (opacity) to electromagnetic radiation. By way of example, one of the following polymers could be used: PEEK (polyetheretheretherketone), PPS (polyphenylene sulfide), PI (polyimide), or equivalent. The panels 41 are also preferably provided to be able to absorb the electromagnetic radiation issuing from the enclosure 13. To that end, the material can be process-colored (preferably in black), or coated with an absorbent paint (for example matte black). In this way, each panel 41 forms a shield to the electromagnetic radiation issuing from the enclosure.

As can be clearly seen in FIG. 6, part of the turnstiles 28 extends to the right of the gap 18, thus impinging locally on the path of the preforms 2. Moreover, in order not to interfere, the turnstiles 28 are longitudinally offset with respect to each other, parallel to the path of the preforms 2, while being positioned as close as possible to each other, being substantially tangent to their peripheries, in such a way as to block the radiation as much as possible.

Figure 5:
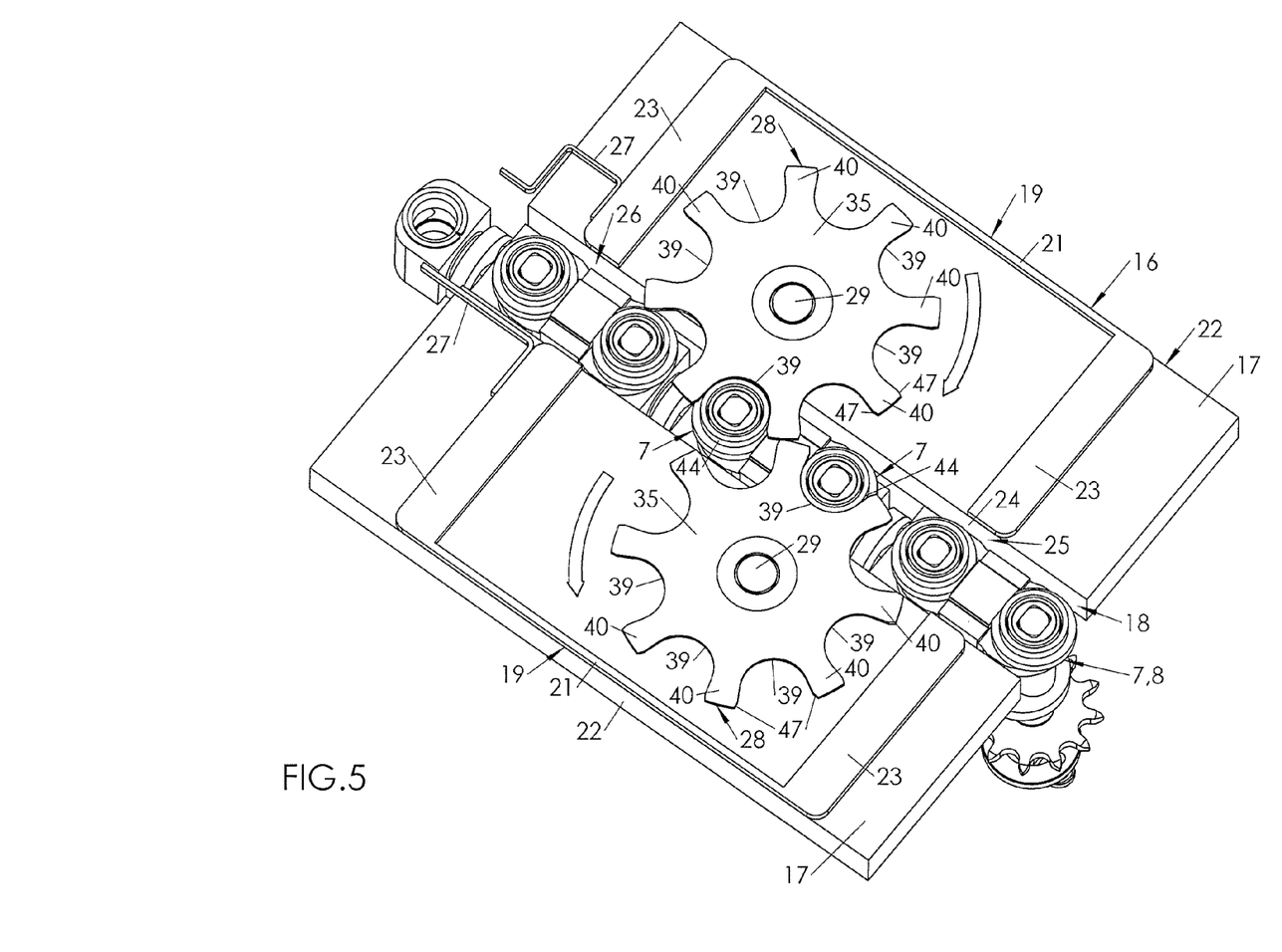
FIG. 5 is a view in perspective of the heating unit of the preceding figures, cut along the horizontal plane V-V of FIG. 3.

FIG. 6 shows that two adjacent panels 41 define two by two an intake zone 43 of an individual preform 2 mounted on a spinner 6, the chain link 7 of which meshes with the lower plate 35. More specifically, as illustrated in FIGS. 4 and 5, the chamber 16 (and its components) and the chain 8 are dimensioned so that the lower plates 35 are located vertically at the level of a cylindrical meshing part 44 of the chain link 7, the radius of which corresponds, within clearance, to the radius of the indentation 39.

In this way, the movement of the chain 8, by meshing of the lower plates 35, drives the turnstiles 28 in rotation around their axes 29 in opposite directions. Thus, in the configuration illustrated in FIG. 5, where it is assumed that the chain 8 circulates from right to left, the turnstile 28 situated upstream (in the lower part of the drawing) is driven in rotation counterclockwise, while the turnstile 28 situated downstream (in the upper part of the drawing) is driven in rotation clockwise, as indicated by the arrows.

A person skilled in the art can precisely dimension the turnstiles 28, and in particular the plates 35, to adapt them to the chain 8, and more specifically to the pitch of said chain and to the diameter of the meshing parts 44 of the chain links 7.

The turnstiles 28 are thus positioned so that no radiation issuing from the enclosure 13 and penetrating through the inner opening 26 of the chamber 16 can directly reach the outer opening 27. Indeed, as a result of the offset arrangement of the turnstiles 28, the panels 41 circulate locally on the path of the preforms 2 while impinging on said path, and thus form, irrespective of the angular position of the turnstiles 28, movable baffles interposed on the trajectory of the radiation.

Irrespective of its angle of incidence in a horizontal plane, any radiation penetrating into the chamber 16 encounters at least one surface (primarily a panel 41, or a sleeve 38) that ensures either a complete absorption of the radiation if its energy is rather weak, or more likely, partial absorption and reflection if the energy of the radiation is relatively high.

Furthermore, as in the example illustrated in FIG. 6, the number of panels 41 (eight per turnstile) is sufficiently high so that any radiation directed toward the outer opening 25 and striking a panel 41 is deflected away from said outer opening 25 (and preferably toward the inner opening 26), so that the radiation necessarily undergoes multiple reflections that quickly deplete its energy. In this way, any residual radiation that may escape from the chamber 16 through the outer opening is so weak in energy that it does not represent any danger to humans, even with prolonged exposure.

This structure makes it possible to preserve the path (in this instance linear) of the preforms, and does not alter the rate of production, which can be maintained at high levels. Indeed, the chamber 16 is passive since the turnstiles 28 are mounted as idlers: being meshed by the chain 8 at the chain's linear speed, they automatically adapt their speed of rotation.

Various provisions can be provided to supplement the characteristics that have just been explained.

Thus, the sealing-off of the chamber 16 can be supplemented:
  by means of strips 45 arranged transversely to straddle the partitions 19 at the openings 25, 26, in order to block off said openings above the preforms 2 (FIG. 2);
  by means of curved plates 46 arranged vertically at the periphery of the turnstiles 28 and partially encircling them, in such a way as to absorb all or part of any radiation that goes around the turnstile 28 (FIG. 3).

Moreover, in order to facilitate the meshing of the turnstiles 28 by the chain 8, the arms 40 can be provided with chamfers 47 (or fillets) on the edges of the indentations 39.

Similarly, although two turnstiles 28 have been described and represented, a larger number of them could be provided, for example staggered in the chamber 16 along the path of the preforms 2.

The implementation of baffles along the path of the electromagnetic radiation in the chamber is in no way limited to the implementation of the turnstiles 28 described above. Thus, shields that are opaque to the radiation could be mounted movably in translation along the path of the preforms, for example on belts stretched between guide rollers and circulating parallel to the path.

The invention claimed is:

1. A unit for processing hollow body blanks made of plastic material that comprises:
  an enclosure in which the blanks pass longitudinally,
  a plurality of laser sources, arranged on at least one side of the enclosure,
  at least one chamber in which the blanks pass longitudinally, the chamber adjoining the enclosure and equipped with movable shields that are opaque to electromagnetic radiation,
  wherein the shields define two by two an intake zone for at least one blank,
  and wherein said shields circulate on a trajectory impinging locally on the path of the blanks.

2. The unit according to claim 1, characterized in that the shields are movable in rotation.

3. The unit according to claim 1, characterized in that the chamber comprises at least one pair of turnstiles mounted in free rotation on either side of the path of the blanks, the turnstiles being capable of being driven in rotation by supports of blanks circulating between them, and comprising a circular series of radial panels arranged in star form, which form said shields.

4. The unit according to claim 3, characterized in that each turnstile comprises a pair of star-shaped plates mounted in free rotation and between which the panels are mounted.

5. The unit according to claim 4, characterized in that the panels radiate in star form from a central sleeve that provides the bracing of the plates.

6. The unit according to claim 4, characterized in that each turnstile comprises a lower plate that impinges locally upon the path of the blanks, said plate being provided at its periphery with a circular series of indentations capable of being engaged by supports of blanks.

7. The unit according to claim 3, characterized in that the turnstiles are offset from each other along the path of the blanks.

8. The unit according to claim 3, characterized in that the turnstiles are tangent to each other at their respective peripheries.

9. The unit according to claim 1, characterized in that the chamber comprises partitions arranged laterally on either side of the path of the blanks, which define two openings in the chamber through which the blanks pass.

10. The unit according to claim 9, characterized in that it comprises spacers arranged on either side of an opening of the chamber toward the enclosure, ensuring a connection, hermetic to the radiation, of the enclosure and the chamber.

* * * * *